US012627715B1

(12) United States Patent
Luo et al.

(10) Patent No.: US 12,627,715 B1
(45) Date of Patent: May 12, 2026

(54) OPEN VOCABULARY CONTENT MODERATION POLICIES VIA MULTI-MODAL EMBEDDINGS

(71) Applicant: Google LLC, Mountain View, CA (US)

(72) Inventors: Enming Luo, Mountain View, CA (US); Wei Qiao, Santa Clara, CA (US); Kathleen Louise Warren, Los Angeles, CA (US); Chih-Chun Chia, Sunnyvale, CA (US); Yuan Wang, Los Altos, CA (US); Dongjin Kwon, Sunnyvale, CA (US); Cyrus Rashtchian, San Diego, CA (US); Benjamin Max Ewing, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 53 days.

(21) Appl. No.: 18/654,686

(22) Filed: May 3, 2024

(51) Int. Cl.
| | |
|---|---|
| *H04L 9/40* | (2022.01) |
| *G06F 40/20* | (2020.01) |
| *G06V 20/62* | (2022.01) |

(52) U.S. Cl.
CPC .............. *H04L 63/20* (2013.01); *G06F 40/20* (2020.01); *G06V 20/635* (2022.01)

(58) Field of Classification Search
CPC ....... G06F 21/106; G06F 40/20; G06N 5/025; H04L 43/028; H04L 51/063; H04L 51/212; H04L 63/0227; H04L 63/0245; H04L 63/0263; H04L 63/20; H04N 21/454
See application file for complete search history.

(56) References Cited

U.S. PATENT DOCUMENTS

| | | | |
|---|---|---|---|
| 8,948,515 B2 | 2/2015 | Boiman et al. | |
| 9,053,517 B2 | 6/2015 | Stanton | |
| 10,726,308 B2 | 7/2020 | Kumar et al. | |
| 11,669,687 B1 * | 6/2023 | Joshi ...................... | G06F 40/30 704/9 |
| 11,995,803 B1 * | 5/2024 | Karpman .................. | G06T 5/70 |

(Continued)

FOREIGN PATENT DOCUMENTS

| | | | | |
|---|---|---|---|---|
| EP | 3401805 A1 * | 11/2018 | ......... | H04N 21/2353 |
| WO | WO-2016038103 A1 * | 3/2016 | ....... | H04N 21/44222 |

(Continued)

OTHER PUBLICATIONS

Chen et al., "PaLI: A Jointly-Scaled Multilingual Language-Image Model", arXiv:2209.06794v4, dated Jun. 5, 2023, 33 pages.

(Continued)

*Primary Examiner* — Oscar A Louie
(74) *Attorney, Agent, or Firm* — DORITY & MANNING, P.A.

(57) ABSTRACT

Users can create natural language prompts that describe a content moderation policy. A computing system can then process these prompts using a machine-learned multi-modal embedding generation model to create policy embeddings. Then, for an item of content to be screened for the content moderation policy, the system can also process the item of content with the machine-learned multi-modal embedding generation model to create one or more content embeddings. The system can then compare the policy embedding(s) with the content embedding(s) to determine whether or not the content violates the content moderation policy.

20 Claims, 6 Drawing Sheets

(56)                References Cited

U.S. PATENT DOCUMENTS

| | | | | |
|---|---|---|---|---|
| 2012/0296634 | A1* | 11/2012 | Revesz | G06F 16/353 |
| | | | | 704/9 |
| 2019/0253744 | A1* | 8/2019 | Huang | H04N 21/234363 |
| 2020/0202071 | A1 | 6/2020 | Ghulati | |
| 2021/0119951 | A1* | 4/2021 | Santos | G06F 40/284 |
| 2021/0174089 | A1* | 6/2021 | Rao | G06V 20/41 |
| 2021/0295177 | A1* | 9/2021 | Joshi | G06N 5/04 |
| 2023/0106416 | A1* | 4/2023 | Gupte | G06F 16/288 |
| | | | | 706/45 |
| 2023/0262093 | A1* | 8/2023 | Gupta | H04L 63/1425 |
| | | | | 726/1 |
| 2023/0396457 | A1* | 12/2023 | Huffman | G10L 15/08 |
| 2024/0054294 | A1* | 2/2024 | Sikka | G06F 40/30 |
| 2024/0106781 | A1* | 3/2024 | Kleppin | H04L 51/52 |
| 2024/0119066 | A1* | 4/2024 | Karlstedt | G06N 5/022 |
| 2024/0155184 | A1* | 5/2024 | Loh | H04N 21/8456 |
| 2024/0273291 | A1* | 8/2024 | Smith | G06F 16/383 |
| 2024/0411751 | A1* | 12/2024 | Radmilac | G06F 16/2433 |
| 2024/0412040 | A1* | 12/2024 | Radmilac | G06N 3/0455 |
| 2024/0428783 | A1* | 12/2024 | Gupta | G06F 40/253 |
| 2025/0045535 | A1* | 2/2025 | Kumar | G06F 40/40 |
| 2025/0118066 | A1* | 4/2025 | Hattori | G06F 40/40 |
| 2025/0156632 | A1* | 5/2025 | Sethuraman | G06F 40/20 |
| 2025/0191307 | A1* | 6/2025 | Chakraborty | G06F 16/90332 |
| 2025/0218206 | A1* | 7/2025 | Rosoff | G06V 30/413 |
| 2025/0252325 | A1* | 8/2025 | Palatnik de Sousa | G06N 5/025 |

FOREIGN PATENT DOCUMENTS

| | | | | |
|---|---|---|---|---|
| WO | WO-2017162919 A1 * | 9/2017 | | G06F 18/214 |
| WO | WO-2022204435 A2 * | 9/2022 | | G06F 21/10 |
| WO | WO-2024159269 A1 * | 8/2024 | | G06F 16/9035 |
| WO | WO-2025000074 A1 * | 1/2025 | | G06N 20/00 |

OTHER PUBLICATIONS

Gallagher, "What is Zero-Shot Classification", Nov. 16, 2023, https://blog.roboflow.com/what-is-zero-shot-classification/, retrieved on May 3, 2024, 7 pages.

Radford et al., "Learning Transferable Visual Models from Natural Language Supervision", arXiv:2103.00020v1, dated Feb. 26, 2021, 48 pages.

* cited by examiner

Prompt Threshing Algorithm

202 Prompt engineering: Domain expertise and LLM rewriting

204 Prompt threshing: Remove bad prompts based on false positives

206 Evaluation: Periodically test model

208 Good coverage & high precision?

No — Refresh prompts to minimize misclassifications

Yes

210 Launch: Deploy the zero-shot model to production

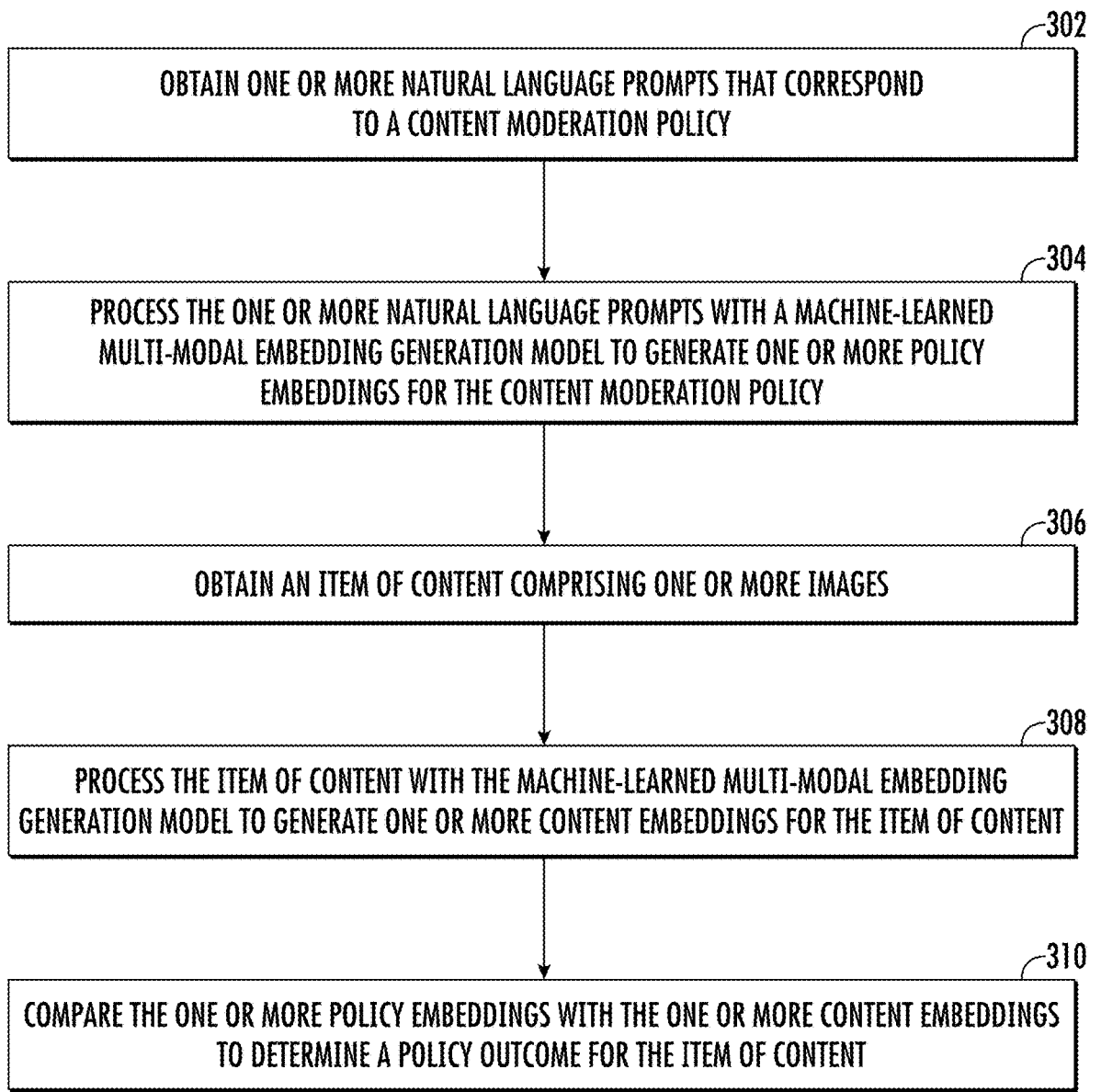

302

OBTAIN ONE OR MORE NATURAL LANGUAGE PROMPTS THAT CORRESPOND
TO A CONTENT MODERATION POLICY

304

PROCESS THE ONE OR MORE NATURAL LANGUAGE PROMPTS WITH A MACHINE-LEARNED
MULTI-MODAL EMBEDDING GENERATION MODEL TO GENERATE ONE OR MORE POLICY
EMBEDDINGS FOR THE CONTENT MODERATION POLICY

306

OBTAIN AN ITEM OF CONTENT COMPRISING ONE OR MORE IMAGES

308

PROCESS THE ITEM OF CONTENT WITH THE MACHINE-LEARNED MULTI-MODAL EMBEDDING
GENERATION MODEL TO GENERATE ONE OR MORE CONTENT EMBEDDINGS FOR THE ITEM OF CONTENT

310

COMPARE THE ONE OR MORE POLICY EMBEDDINGS WITH THE ONE OR MORE CONTENT EMBEDDINGS
TO DETERMINE A POLICY OUTCOME FOR THE ITEM OF CONTENT

FIG. 3

OPEN VOCABULARY CONTENT MODERATION POLICIES VIA MULTI-MODAL EMBEDDINGS

FIELD

The present disclosure relates generally to content moderation. More particularly, the present disclosure relates to the use of a machine-learned multi-modal embedding generation model to enable open vocabulary content moderation.

BACKGROUND

Digital content moderation includes the identification and classification of content that violates various nuanced policies. Traditional content moderation systems often rely on classifiers that are trained on specific datasets labeled according to a single policy. These classifiers struggle to adapt to the multifaceted nature of content that may span across multiple policy domains, each with its own set of rules and characteristics.

Additionally, the computational burden of processing and classifying large volumes of content against an ever-growing list of policies poses a significant technical hurdle. Existing systems face difficulties in efficiently scaling up to handle the increasing complexity and volume of content, which can lead to bottlenecks and delays in content moderation workflows. This technical problem is amplified in environments where real-time or near-real-time content moderation is performed, and/or where the computational resources are finite and must be judiciously utilized.

SUMMARY

Aspects and advantages of embodiments of the present disclosure will be set forth in part in the following description, or can be learned from the description, or can be learned through practice of the embodiments.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method for open vocabulary content moderation. The computer-implemented method also includes obtaining, by a computing system may include one or more computing devices, one or more natural language prompts that correspond to a content moderation policy. The method also includes processing, by the computing system, the one or more natural language prompts with a machine-learned multi-modal embedding generation model to generate one or more policy embeddings for the content moderation policy. The method also includes obtaining, by the computing system, an item of content may include one or more images. The method also includes processing, by the computing system, the item of content with the machine-learned multi-modal embedding generation model to generate one or more content embeddings for the item of content. The method also includes comparing, by the computing system, the one or more policy embeddings with the one or more content embeddings to determine a policy outcome for the item of content. Other embodiments of this aspect include corresponding computer systems, apparatus, and computer programs recorded on one or more computer storage devices, each configured to perform the actions of the methods.

One general aspect includes a computer system for open vocabulary content moderation. The computer system also includes a processor. The system also includes a memory coupled to the processor, the memory storing instructions that, when executed by the processor, cause the system to: obtain one or more natural language prompts that correspond to a content moderation policy; process the one or more natural language prompts with a machine-learned multi-modal embedding generation model to generate one or more policy embeddings for the content moderation policy; obtain an item of content may include one or more images; process the item of content with the machine-learned multi-modal embedding generation model to generate one or more content embeddings for the item of content; and compare the one or more policy embeddings with the one or more content embeddings to determine a policy outcome for the item of content. Other embodiments of this aspect include corresponding computer systems, apparatus, and computer programs recorded on one or more computer storage devices, each configured to perform the actions of the methods.

One general aspect includes a non-transitory computer-readable medium storing instructions for performing operations. The non-transitory computer-readable medium storing instructions for obtaining one or more natural language prompts that correspond to a content moderation policy. The non-transitory computer-readable medium also storing instructions for processing the one or more natural language prompts with a machine-learned multi-modal embedding generation model to generate one or more policy embeddings for the content moderation policy. The non-transitory computer-readable medium also storing instructions for obtaining an item of content may include one or more images. The non-transitory computer-readable medium also storing instructions for processing the item of content with the machine-learned multi-modal embedding generation model to generate one or more content embeddings for the item of content. The non-transitory computer-readable medium also storing instructions for comparing the one or more policy embeddings with the one or more content embeddings to determine a policy outcome for the item of content. Other embodiments of this aspect include corresponding computer systems, apparatus, and computer programs recorded on one or more computer storage devices, each configured to perform the actions of the methods. Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims.

The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 3 depicts a flow chart diagram of an example method to perform content moderation according to example embodiments of the present disclosure.

Figure 1:
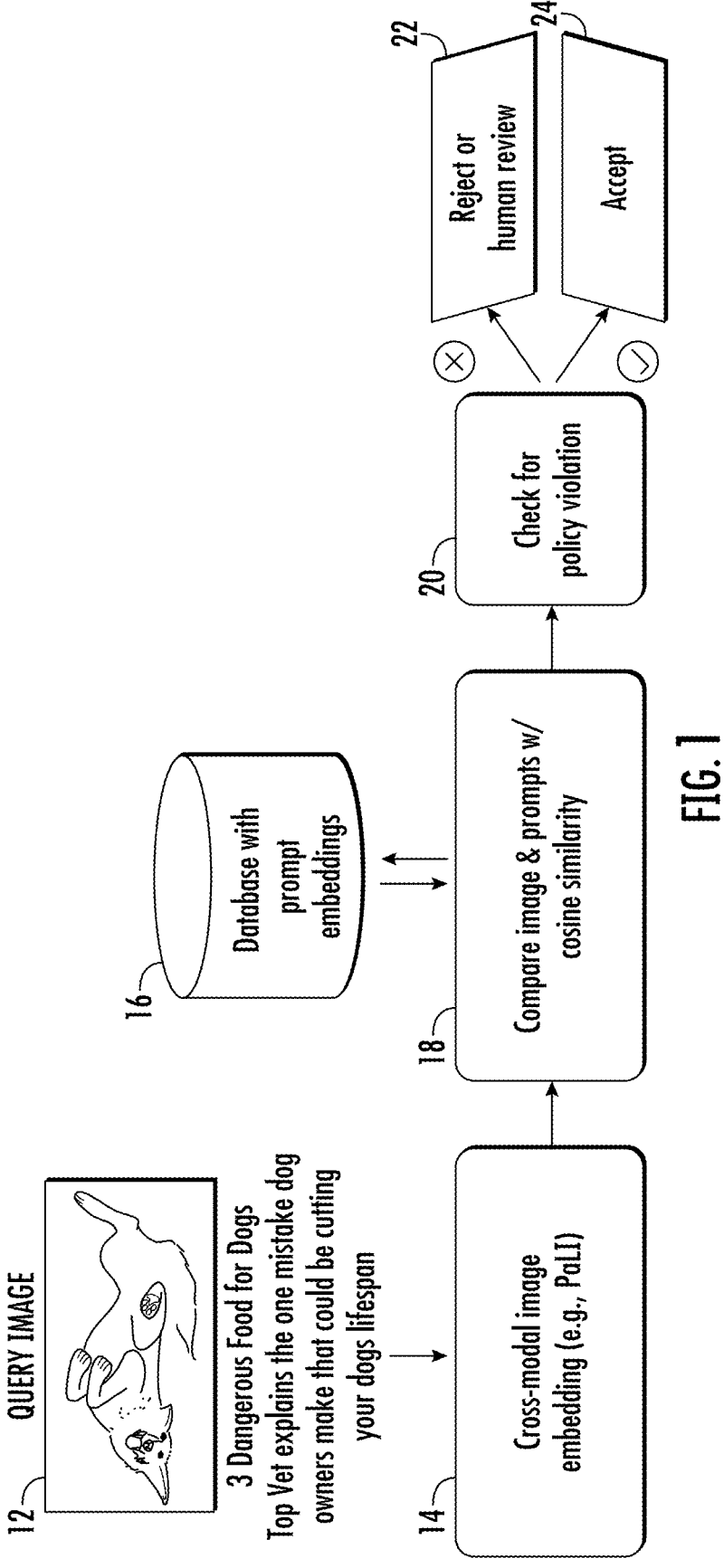
FIG. 1 depicts a schematic diagram of an example process to perform content moderation according to example embodiments of the present disclosure.

Reference numerals that are repeated across plural figures are intended to identify the same features in various implementations.

DETAILED DESCRIPTION

Prior techniques in content moderation have often relied on closed vocabulary systems, which are limited to pre-defined sets of terms and struggle to adapt to the dynamic and multifaceted nature of online content. These systems require extensive retraining to accommodate new policies or emerging types of content, leading to significant delays and computational burdens. As the volume and complexity of online content continue to grow, these traditional systems face challenges in scaling efficiently and maintaining real-time moderation capabilities.

The present disclosure addresses these issues by proposing a novel approach that utilizes open vocabulary guided by cross-modality semantic matching. Example implementations leverage text-image co-embeddings to match descriptive prompts with content (e.g., images) for content moderation purposes. By enabling the use of natural language prompts that can describe a policy or a subspace of the policy, the system accommodates a wide range of expressions and concepts without the need for retraining. The prompts can be crafted by domain experts or suggested by advanced language models, ensuring comprehensive coverage of the policy space.

Thus, in one example, users can create natural language prompts that describe a content moderation policy. A computing system can then process these prompts using a machine-learned multi-modal embedding generation model to create policy embeddings. Then, for an item of content to be screened for the content moderation policy, the system can also process the item of content with the machine-learned multi-modal embedding generation model to create one or more content embeddings. The system can then compare the policy embedding(s) with the content embedding(s) to determine whether or not the content violates the content moderation policy.

The proposed approach offers a more agile and adaptive system capable of handling the nuanced and evolving landscape of online content. The approach also reduces the computational load by requiring only a single embedding calculation per content item, which can be compared against multiple policy embeddings. This results in a lightweight and scalable system suitable for real-time content moderation across various policies. Moreover, the system democratizes the process of creating classifiers by allowing users to define policies through natural language, making it accessible to a broader audience without the need for technical expertise in machine learning. Overall, the present disclosure provides a more efficient, flexible, and user-friendly solution to the technical challenges of modern content moderation.

More particularly, a content moderation system can be configured to obtain a set of natural language prompts that are indicative of a content moderation policy. The natural language prompts can serve as descriptors or criteria that the system will later use to evaluate content. Thus, the prompts can be or include textual descriptions of the content moderation policy.

The prompts can describe content that is in-scope of the content moderation policy and/or can describe content that is out-of-scope of the content moderation policy. In-scope content refers to material that falls within the parameters of a content moderation policy and may potentially violate its rules, whereas out-of-scope content refers to material that lies outside those parameters and is compliant with the policy guidelines.

The content moderation system can obtain the prompts through various approaches, such as by allowing users to input prompts directly into a user interface, which are then stored in a database. Alternatively, the system can generate prompts automatically by employing natural language processing algorithms, which analyze policy documents and extract key phrases that accurately reflect the policy's intent. In another example, the system could also interface with pre-existing large language models to refine or expand upon user-generated prompts, ensuring they are comprehensive and contextually relevant.

The prompts can range from simple phrases to complex sentences and can be crafted based on domain expertise or with the assistance of language models. For example, prompts could include "A before and after image for a medical procedure" or "Security camera footage with a time or date stamp on the image," each providing a different aspect of the policy to be enforced.

In some implementations, the natural language prompts can be or include user-generated prompts, which can be crafted by users familiar with the nuances of the content moderation policy. For instance, a domain expert in medical advertising might generate prompts that accurately capture the subtleties of what constitutes an unethical medical advertisement.

In some implementations, the natural language prompts can be or include model-generated prompts, which can be created by machine-learned models. For example, a machine-learned model (e.g., large language model) can be used to rewrite user-supplied prompts. In another example, a machine-learned model (e.g., large multi-modal model) can be used to generate captions for user-supplied images. For example, a language model might generate a prompt by captioning an image of a risky stunt as "An image showing a potentially dangerous activity," which could then be used to identify similar content that violates safety policies.

Next, the content moderation system can process the natural language prompts to generate a set of policy embeddings. For example, the content moderation system can utilize a machine-learned multi-modal embedding generation model to transform one or more natural language prompts into policy embeddings that represent the criteria of a content moderation policy. To implement this concept, the content moderation system could perform operations such as tokenizing the text of the prompts, feeding the tokenized data into a neural network trained on text and image data, and generating a high-dimensional vector for each prompt that captures its semantic meaning within the context of content moderation.

In particular, a multi-modal embedding generation model can be one machine learning model or multiple inter-related machine learning models that are configured to process and interpret different types of data-like text and images-into a shared vector space, creating numerical representations known as embeddings. This shared space allows the model to capture the semantic relationships between modalities, making it possible to compare and relate information across text and visual content.

Some example embedding generation models can use neural networks tailored for each modality to extract features and align the embeddings so that semantically similar concepts, regardless of being text or image or other modalities, are close to each other in this space. Some embedding generation models can be trained on a vast array of input pairs (e.g., image and text pairs). By training the model on paired examples of text and images that are contextually related, the embeddings are aligned so that similar concepts, regardless of modality, are positioned closely in the embedding space. For example, during training, the model can learn to reduce the distance between the embeddings of the text and the corresponding image while increasing the distance between non-corresponding pairs. This process is often achieved through contrastive learning, where the model is rewarded for correctly matching pairs and penalized for mismatches.

Once the policy embeddings are generated, the content moderation system can obtain content, such as images, and process them using the same multi-modal embedding generation model to create content embeddings. This process ensures that both the policy descriptions and the content are represented in a shared semantic space, allowing for accurate comparison. For instance, an incoming image could be embedded and then compared to the policy embeddings to determine if it violates any content moderation policies.

In particular, the content moderation system can compare the policy embeddings with the content embeddings to determine the policy outcome for a piece of content. In some implementations, the system can compute a cosine similarity between the embeddings to assess their closeness in the semantic space. A high similarity to an in-scope policy embedding might indicate a policy violation, while a lower similarity would suggest compliance. For example, if the cosine similarity between the embedding of an image and the embedding of an in-scope prompt exceeds a certain threshold, the system might flag the image as violating a policy against graphic content.

As discussed above, in addition or alternatively to serving as indicators for in-scope content that may violate a content moderation policy, textual descriptions or prompts can also be crafted to delineate content that is out-of-scope or compliant with the policy. This dual functionality enables the content moderation system to not only detect potential policy violations but also to recognize and allow content that aligns with the policy's intent and guidelines.

Specifically, out-of-scope textual descriptions can be used to generate policy embeddings that represent content types or criteria that should not be flagged as violations. By comparing content embeddings with these out-of-scope policy embeddings, the system can more accurately discern between actual violations and permissible content, thereby reducing false positives and improving the overall efficiency of the moderation process. For example, a high similarity to an out-of-scope policy embedding might indicate policy compliance. For example, if the cosine similarity between the embedding of an image and the embedding of an out-of-scope prompt exceeds a certain threshold, the system might indicate that the image complies with the content moderation policy. In some implementations, a balanced set of in-scope and out-of-scope textual descriptions can be used to define a nuanced content moderation policy.

In some implementations, the content moderation system can also average the cosine similarities across multiple policy embeddings when comparing them to a content embedding. This approach can provide a more robust assessment by considering the policy as described by a collection of prompts rather than a single prompt. For instance, an image might be compared against a set of prompts related to a policy, and the average similarity score could be used to determine if the image collectively matches the policy's description. When both in-scope and out-of-scope prompts are used, a signed average similarity score can be used, where in-scope similarities are assigned a first sign (e.g., negative) and out-of-scope similarities are assigned the opposite sign (e.g., positive).

The content moderation system can perform a process known as prompt threshing to improve the quality of the prompts used for content moderation. In this process, a plurality of candidate in-scope prompts can be evaluated against negative examples-content that does not violate the policy-to filter out prompts that might cause false positives. For instance, an in-scope prompt that matches too many negative examples might be discarded as it could lead to an undesirable number of incorrect policy violation flags.

In some implementations, prompt threshing can include using a production dataset to provide negative examples. In some implementations, a random selection of images from a production environment can serve as a negative set, which helps in identifying in-scope prompts that are too broad or inaccurate. For example, a prompt like "An image with any text overlay" might be threshed out because it matches a large number of negative examples that do not violate any specific policy. Thus, the present disclosure provides a versatile and efficient approach to content moderation using zero-shot classification based on text and image embeddings. By employing natural language prompts and multi-modal embeddings, the system can accurately and quickly determine policy violations in content, such as images. This method is adaptive, scalable, and cost-effective, offering a significant advantage in the field of content moderation.

The systems and methods of the present disclosure provide a number of technical effects and benefits. As one example, the proposed technology enables users to craft open vocabulary natural language expressions that encapsulate the intricacies of a given content moderation policy, thereby creating a classifier that is finely tuned to the specific requirements of that policy. The term "open vocabulary" refers to the system's ability to understand and process a wide and potentially unlimited range of words, phrases, or concepts. Unlike closed vocabulary systems, which are limited to a predefined set of terms, open vocabulary systems are not restricted to a specific lexicon and can adapt to new or unexpected inputs.

The proposed open vocabulary system is particularly useful because of its ability to interpret and respond to a vast array of terminology, including neologisms and evolving language use. In content moderation, an open vocabulary approach allows the system to recognize and act upon content that includes previously unknown or unanticipated descriptions, ensuring that the moderation remains effective even as new trends and expressions emerge. This flexibility is especially important in the dynamic landscape of online content, where language can rapidly change and new forms of policy-violating content can arise.

This level of nuance is a significant advantage over more generic classifiers that may only understand broad categories or single-word descriptors. For instance, instead of a simplistic classification term like "cat," a user can construct detailed multi-word or multi-concept sentences that convey complex concepts, such as "An image depicting a medical procedure before and after treatment, intended to mislead the viewer," to create a classifier that can discern with greater precision whether content violates the nuanced policy against deceptive medical advertisements. This capability empowers users to address subtle distinctions in content that generic classifiers might overlook, leading to more accurate and context-sensitive content moderation.

Furthermore, this approach democratizes the process of policy enforcement by allowing any user, regardless of their technical expertise, to contribute to the creation of content moderation policy classifiers through natural language. Users can simply type out sentences that describe the nuances of the policy they wish to enforce, and the pre-trained model can interpret these descriptions to carry out the policy without the need for additional model training. This not only simplifies the process of adapting the system to new or evolving policies but also makes it more accessible to a broader range of users, including those who may not have the resources or technical know-how to train a machine learning model from scratch. The result is a content moderation system that is both powerful in its precision and inclusive in its design, enabling a wider community to participate in the crafting and enforcement of content policies.

As another example, in some implementations, the technology directly interacts with technical systems by controlling and moderating content based on policy violations, which is a technical task. For example, the method's application to moderating images on a digital platform include processing and analysis of digital content, which is a technical process that interfaces with physical computer hardware and networks.

As another example, the proposed approach is designed to be computationally efficient, requiring the calculation of embedding(s) only once for each item of content. This single set of embedding encapsulates the content's features and can then be compared against multiple different policy embeddings that correspond to multiple different content moderation policies. In some cases, the policy embeddings may be pre-computed. As a result, the same content embedding for a particular item of content can be effectively utilized to evaluate compliance with numerous different policies without the need for recalculating embeddings for each policy check. This streamlined process significantly reduces the computational overhead associated with applying content moderation across a vast array of different policies, making the system highly scalable and lightweight in terms of resource consumption. This efficiency is particularly advantageous when moderating content at scale, as it allows for rapid and simultaneous enforcement of multiple content policies.

With reference now to the FIG.s, example embodiments of the present disclosure will be discussed in further detail.

Referring now to FIG. 1, the figure illustrates an exemplary workflow of the open vocabulary content moderation system utilizing cross-modality semantic matching for policy enforcement. The system begins with a query image 12, which is an item of content to be evaluated against a content moderation policy. The query image 12 is processed to generate a cross-modal image embedding 14 using a machine-learned multi-modal embedding generation model, such as PaLI. This embedding represents the semantic content of the query image in a numerical vector space, facilitating the comparison with policy descriptors.

The next component in the workflow is a database 16 containing pre-generated policy embeddings. These embeddings are derived from natural language prompts that describe various aspects of the content moderation policy. The database 16 serves as a repository of policy criteria against which incoming content can be evaluated.

The system then employs a comparison mechanism 18 to compare the embedding of the query image 12 with the embeddings of the prompts stored in the database 16. In some implementations, the comparison can be based on cosine similarity, a metric used to determine the closeness of two embeddings in the vector space. A higher cosine similarity suggests a closer match between the content of the query image and the corresponding prompt.

Upon comparison, the system proceeds to a policy violation check 20, where it determines whether the query image violates the content moderation policy based on the similarity scores. As one example, if the cosine similarity between the image embedding and any prompt embedding generated from an in-scope prompt exceeds a pre-defined threshold, the query image may be flagged for further action.

The final decision point in the workflow is represented by a dual-pathway outcome, where the content is either accepted 24 or flagged 22 for rejection or human review. The accept pathway 24 indicates that the content does not violate the policy and is permitted to pass through the moderation system. Conversely, the reject or human review pathway 22 indicates that the content has been flagged as potentially violating the policy, necessitating further inspection and/or immediate rejection.

Figure 2:
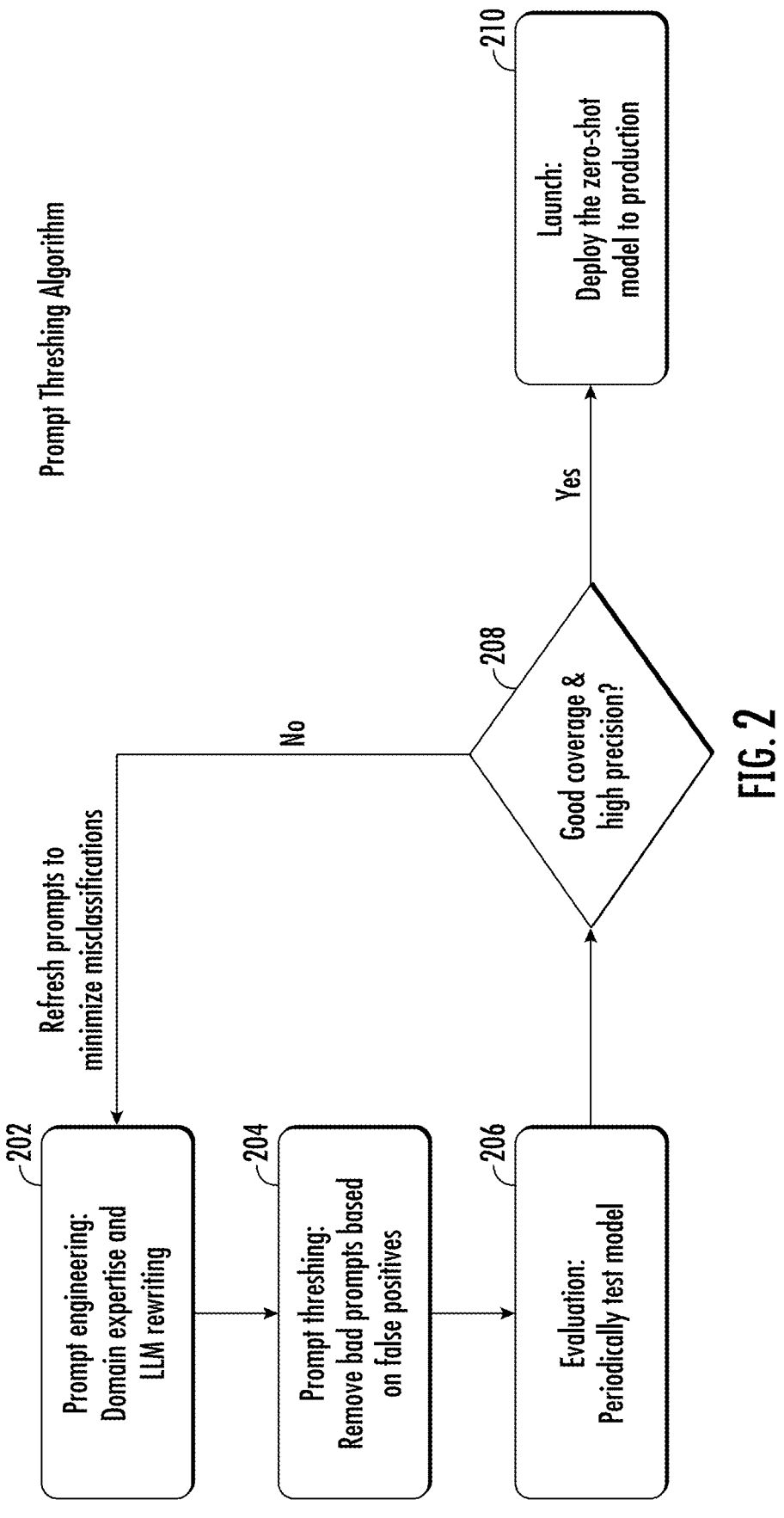
FIG. 2 depicts a schematic diagram of an example process to perform prompt threshing according to example embodiments of the present disclosure.

Referring now to FIG. 2, the figure illustrates the operational flow of an example prompt threshing algorithm, a component of an example open vocabulary content moderation system. The diagram outlines the iterative process that refines the set of prompts used for content moderation, ensuring high precision and comprehensive policy coverage.

The process begins with a prompt engineering step 202, where domain expertise and/or LLM rewriting are employed to generate an initial set of natural language prompts. This step can involve domain experts using their knowledge to create prompts manually, or it can include the utilization of large language models (LLMs) to assist in rewriting or generating prompts. For example, a domain expert might generate a prompt such as "An image depicting an unauthorized medical advertisement," while an LLM might reformulate this into a more nuanced prompt based on additional context provided by the user.

Following the creation of these prompts, the system proceeds to prompt threshing step 204. In this stage, the algorithm works to remove bad prompts that are likely to cause false positives in content classification. This can be accomplished by comparing the in-scope prompts against a set of negative examples-content known not to violate the policy—and identifying in-scope prompts that incorrectly match these negative examples. For instance, a prompt such as "Any image with text" might be removed if it matches a significant number of negative examples, indicating it is too broad and not specific enough to the policy in question.

Next, an evaluation step 206 can include periodic testing of the model to assess its performance. This can include measuring metrics such as precision, recall, and coverage to ensure that the model is accurately identifying content that violates the policy without overreaching to non-violating content. For example, the evaluation might reveal that the model is adept at catching images with graphic content but is also flagging benign images with similar features, indicating a need for further refinement of the prompts.

A decision 208 represents a checkpoint where the system determines if the current set of prompts provides good coverage and high precision for the content moderation policy. If the evaluation indicates that the model's performance is not yet satisfactory, the process loops back to refresh the prompts to minimize misclassifications, iterating through the prompt engineering step 202 and threshing step 204 as needed.

Once the system achieves good coverage and high precision, as determined at decision point 208, the process moves to a launch step 210. Here, the model, represented by or equipped with the refined set of prompts, is deployed to production, where it can begin moderating content in real-time. This deployment can include integrating the model into existing content management systems, where it can automatically flag or approve content based on the policy embeddings and the content embeddings' similarity.

Referring now to FIG. 3, the figure illustrates an exemplary operational flowchart of the open vocabulary content moderation method, as per the present disclosure. The method begins at step 302, where the content moderation system obtains one or more natural language prompts that correspond to a content moderation policy. These prompts are the foundation of the content moderation process, serving as descriptors for the policy that will be enforced. They can be generated by users or domain experts who have an intimate understanding of the policy and/or can be suggested by sophisticated language models.

At step 304, the system processes the obtained natural language prompts with a machine-learned multi-modal embedding generation model to generate one or more policy embeddings for the content moderation policy. The processing can include transforming the textual information of the prompts into a numerical form that can be compared against content embeddings. This step may include tokenizing the text, feeding it into a neural network, and outputting a high-dimensional vector that captures the semantic meaning of each prompt within the context of the content moderation policy.

Subsequently, at step 306, the system obtains an item of content comprising one or more images. This content is what the system aims to evaluate against the content moderation policy. For example, the content could be an image uploaded to a social media platform that needs to be screened for compliance with the platform's safety guidelines. In another example, the content could be a webpage, a social media post, a video, and/or other items of content.

The method proceeds to step 308, where the system processes the item of content with the machine-learned multi-modal embedding generation model to generate one or more content embeddings for the item of content. Similar to the processing of the prompts, this step translates the visual information of the content into a numerical vector within the same semantic space as the policy embeddings. This allows the system to perform a meaningful comparison between the content and the policy descriptors.

Finally, at step 310, the system compares the one or more policy embeddings with the one or more content embeddings to determine a policy outcome for the item of content. This comparison can involve computing the cosine similarity between the embeddings to assess their closeness in the semantic space. As one example, if the similarity between the content embedding and a policy embedding generated from an in-scope prompt exceeds a certain threshold, the system may determine that the content violates the content moderation policy. Conversely, if the similarity is below the threshold, the content may be deemed compliant with the policy. As another example, if the similarity between the content embedding and a policy embedding generated from an out-of-scope prompt exceeds a certain threshold, the system may determine that the content satisfies the content moderation policy.

This step 310 enables the system to make an informed decision about the content without the need for dedicated training for each specific policy, exemplifying the efficiency and adaptability of the zero-shot classification approach.

In some implementations, determining the policy outcome at step 310 can include controlling a computer system based on the policy outcome, thereby enabling automated enforcement actions that align with the content moderation policy. For example, if the comparison at step 310 indicates that an uploaded image violates a platform's policy against violent content, the system can automatically restrict the image from being displayed, flag it for review by human moderators, or even notify the uploader about the violation. In another scenario, the system might integrate with advertising platforms to prevent the display of ads that are deemed non-compliant with advertising standards, ensuring that only appropriate content is presented to users. This level of automation streamlines the moderation process, reduces the burden on human moderators, and ensures a consistent application of the policy across the platform.

Figure 4A:
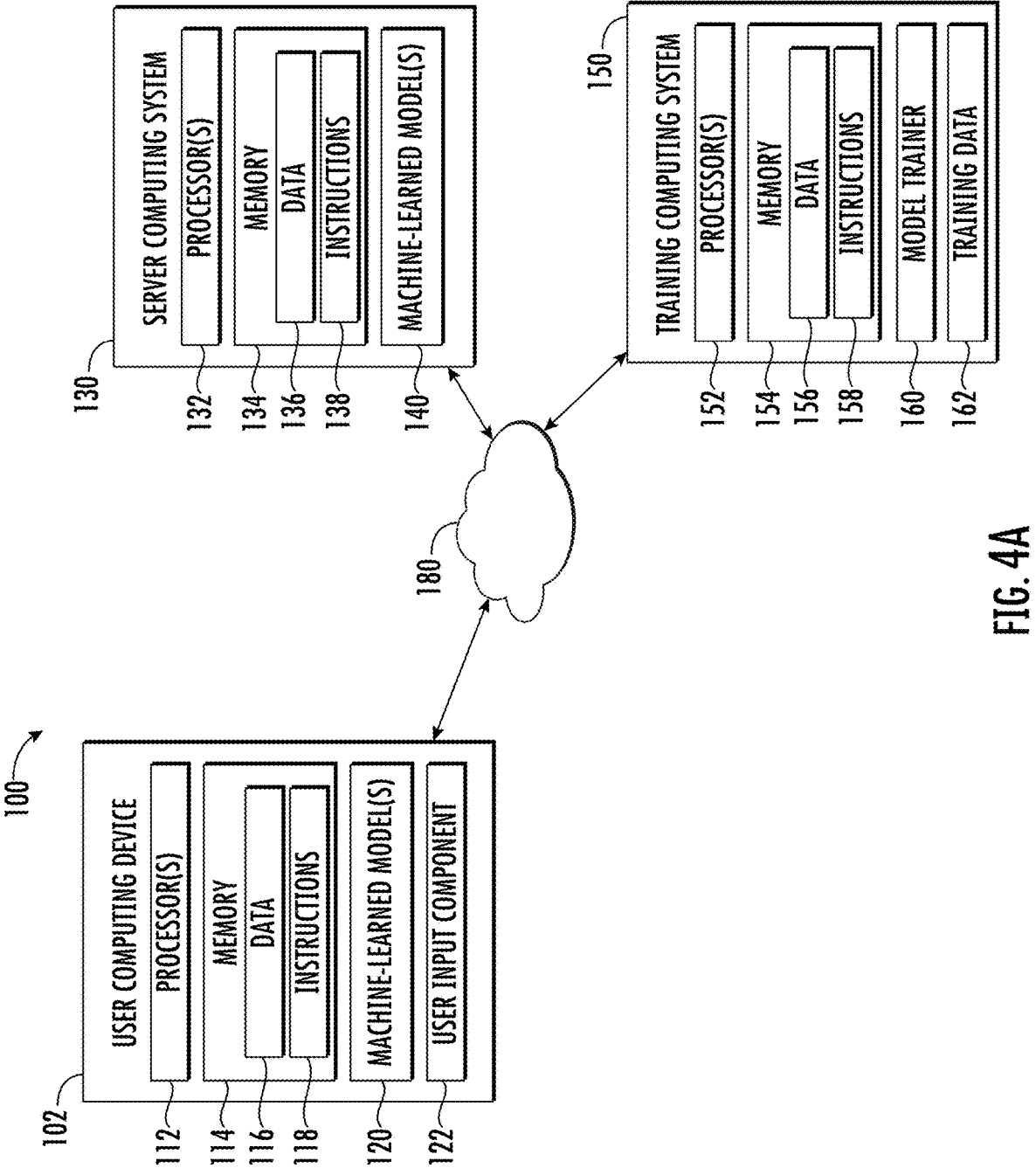
FIG. 4A depicts a block diagram of an example computing system that performs content moderation according to example embodiments of the present disclosure.

FIG. 4A depicts a block diagram of an example computing system 100 that performs content moderation according to example embodiments of the present disclosure. The system 100 includes a user computing device 102, a server computing system 130, and a training computing system 150 that are communicatively coupled over a network 180. Some or all of the system 100 can perform content moderation and can therefore be referred to as a content moderation system.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations. In some implementations, the instructions 118 can be instructions for performing the operations depicted in or discussed with reference to FIGS. 1-3.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 1-3.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel content moderation across multiple items of content).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a content moderation service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations. In some implementations, the instructions 138 can be instructions for performing the operations depicted in or discussed with reference to FIGS. 1-3.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1-3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, multi-modal pairs of items, such as text-image pairs.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 4A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 4B:
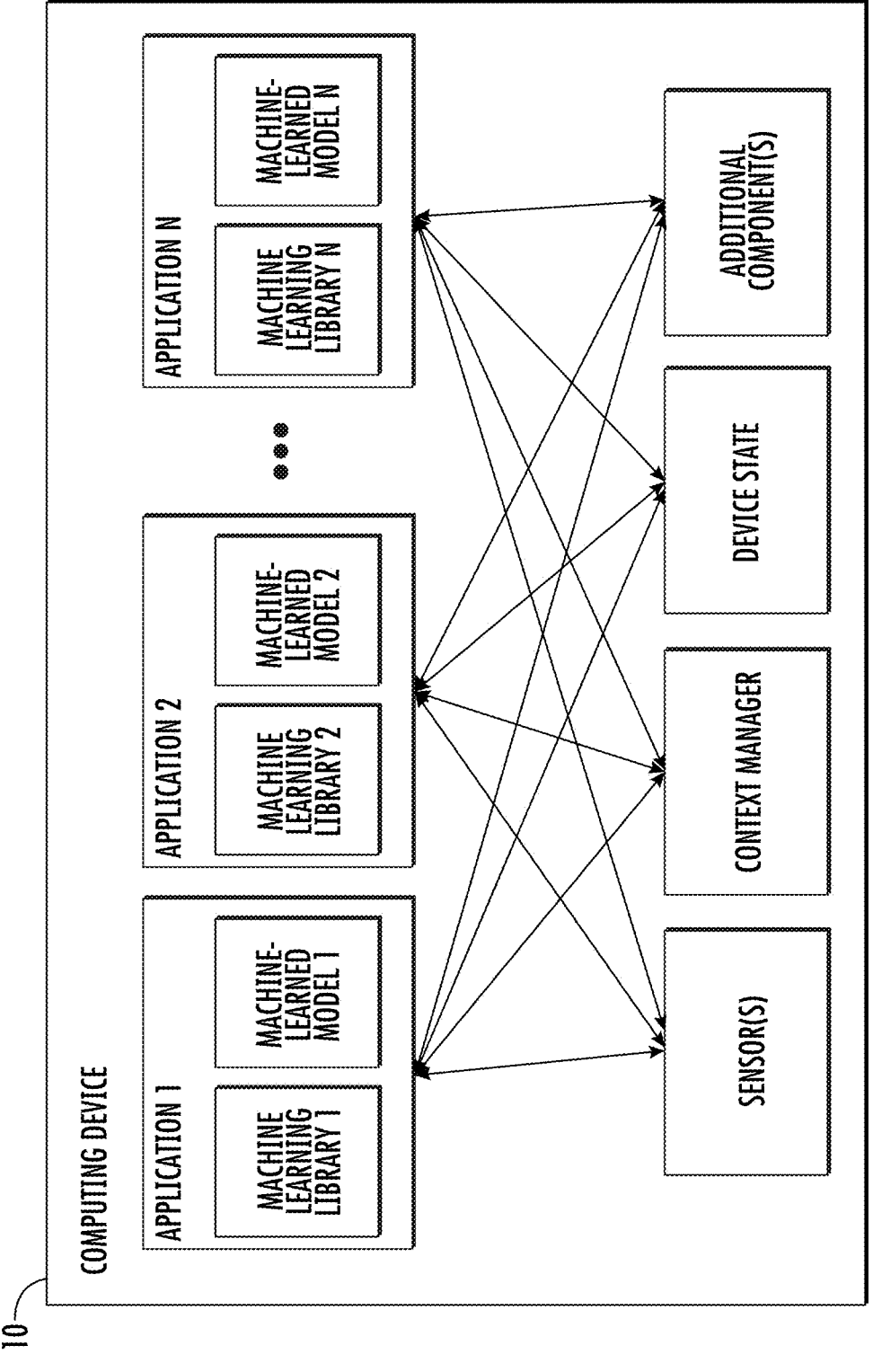
FIG. 4B depicts a block diagram of an example computing device that performs content moderation according to example embodiments of the present disclosure.

FIG. 4B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
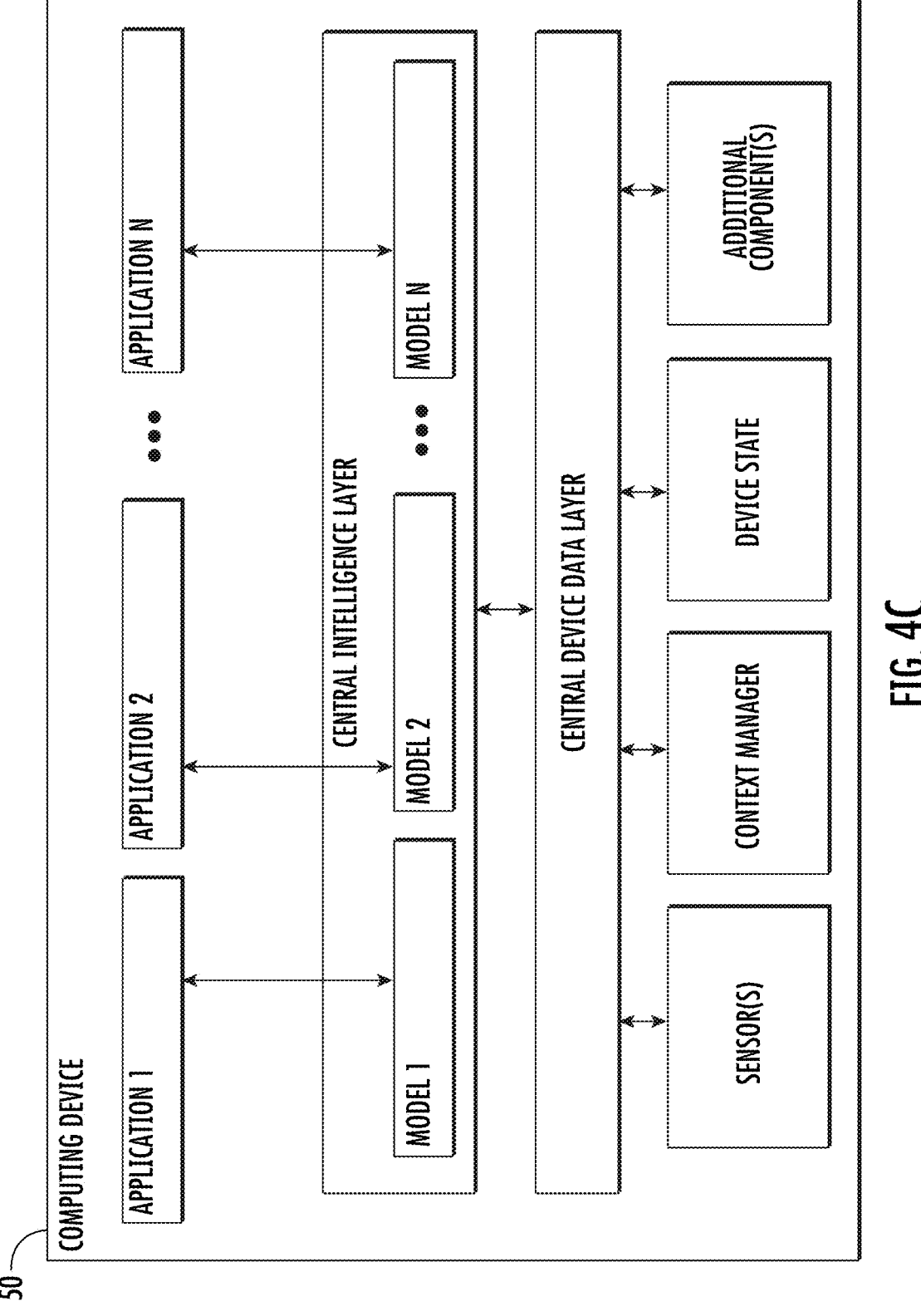
FIG. 4C depicts a block diagram of an example computing device that performs content moderation according to example embodiments of the present disclosure.

FIG. 4C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for open vocabulary content moderation, the method comprising:

obtaining, by a computing system comprising one or more computing devices, one or more natural language prompts that correspond to a content moderation policy;

processing, by the computing system, the one or more natural language prompts with a machine-learned model to generate one or more policy embeddings for the content moderation policy;

obtaining, by the computing system, an item of content comprising one or more images;

processing, by the computing system, the item of content with the machine-learned model to generate one or more content embeddings for the item of content, wherein a single machine-learned multi-modal embedding generation model is used as the machine-learned model to generate both the one or more policy embeddings for the content moderation policy and the one or more content embeddings for the item of content; and comparing, by the computing system, the one or more policy embeddings with the one or more content embeddings to determine a policy outcome for the item of content.

2. The computer-implemented method of claim 1, wherein at least one of the one or more natural language prompts comprises a plurality of words.

3. The computer-implemented method of claim 1, wherein comparing, by the computing system, the one or more policy embeddings with the one or more content embeddings to determine the policy outcome for the item of content comprises:

determining, by the computing system, a cosine similarity between the one or more policy embeddings and the one or more content embeddings; and comparing, by the computing system, the cosine similarity to a threshold value to determine the policy outcome for the item of content.

4. The computer-implemented method of claim 3, wherein:

the one or more natural language prompts comprise a plurality of natural language prompts; and processing, by the computing system, the one or more natural language prompts with the machine-learned multi-modal embedding generation model to generate the one or more policy embeddings for the content moderation policy comprises processing, by the computing system, the plurality of natural language prompts with the machine-learned multi-modal embedding generation model to generate a plurality of policy embeddings; and determining, by the computing system, the cosine similarity between the one or more policy embeddings and the one or more content embeddings comprises determining, by the computing system, a signed average cosine similarity between the plurality of policy embeddings and the one or more content embeddings.

5. The computer-implemented method of claim 1, wherein at least one of the one or more natural language prompts comprises a user-generated prompt generated by a user associated with the content moderation policy.

6. The computer-implemented method of claim 1, wherein at least one of the one or more natural language prompts comprises a model-generated prompt generated by a machine-learned model, wherein the machine-learned model generates the model-generated prompt by re-writing a user-supplied natural language prompt.

7. The computer-implemented method of claim 1, wherein at least one of the one or more natural language prompts comprises a model-generated prompt generated by a machine-learned model, wherein the machine-learned model generates the model-generated prompt by captioning a user-supplied image.

8. The computer-implemented method of claim 1, wherein obtaining, by the computing system, the one or more natural language prompts comprises:

obtaining, by the computing system, a plurality of candidate natural language prompts; and performing, by the computing system, prompt threshing to select the one or more natural language prompts from the plurality of candidate natural language prompts.

9. The computer-implemented method of claim 8, wherein performing, by the computing system, prompt threshing comprises:

obtaining, by the computing system, a plurality of negative examples, each negative example comprising an example item of content that does not violate the content moderation policy; and for each of the candidate natural language prompts that is an in-scope prompt:

comparing, by the computing system, a candidate policy embeddings generated from the candidate natural language prompt with a plurality of negative example embeddings generated from the plurality of negative examples to determine a number of false positives.

10. The computer-implemented method of claim 9, wherein the plurality of negative examples comprise a plurality of images randomly selected from a production dataset.

11. The computer-implemented method of claim 1, wherein the single machine-learned multi-modal embedding generation model is configured to process different types of data, including the one or more natural language prompts and the item of content, into a shared semantic space to perform a comparison between the one or more policy embeddings and the one or more content embeddings.

12. A computer system for open vocabulary content moderation, the system comprising:

a processor;

a memory coupled to the processor, the memory storing instructions that, when executed by the processor, cause the system to:

obtain one or more natural language prompts that correspond to a content moderation policy;

process the one or more natural language prompts with a machine-learned model to generate one or more policy embeddings for the content moderation policy;

obtain an item of content comprising one or more images;

process the item of content with the machine-learned model to generate one or more content embeddings for the item of content, wherein a single machine-learned multi-modal embedding generation model is used as the machine-learned model to generate both the one or more policy embeddings for the content moderation policy and the one or more content embeddings for the item of content; and compare the one or more policy embeddings with the one or more content embeddings to determine a policy outcome for the item of content.

13. The computer system of claim 12, wherein the instructions further cause the system to determine a cosine similarity between the one or more policy embeddings and the one or more content embeddings, and compare the cosine similarity to a threshold value to determine the policy outcome for the item of content.

14. The computer system of claim 13, wherein the one or more natural language prompts include a plurality of natural language prompts, and the system is configured to process the plurality of natural language prompts to generate a plurality of policy embeddings and determine an average cosine similarity between the plurality of policy embeddings and the one or more content embeddings.

15. The computer system of claim 12, wherein the instructions further cause the system to accept user-generated prompts, wherein at least one of the one or more natural language prompts is generated by a user associated with the content moderation policy.

16. The computer system of claim 12, wherein the instructions further cause the system to generate model-generated prompts, wherein at least one of the one or more natural language prompts is generated by a machine-learned model based on a user-supplied natural language prompt.

US 12,627,715 B1

17

17. The computer system of claim 12, wherein the instructions further cause the system to generate model-generated prompts, wherein at least one of the one or more natural language prompts is generated by a machine-learned model based on captioning a user-supplied image.

18. The computer system of claim 12, wherein the instructions further cause the system to obtain a plurality of candidate natural language prompts and perform prompt threshing to select the one or more natural language prompts from the plurality of candidate natural language prompts.

19. The computer system of claim 18, wherein the prompt threshing includes comparing candidate policy embeddings generated from the candidate natural language prompts that are in-scope with a plurality of negative example embeddings generated from a plurality of negative examples to determine a number of false positives.

20. A non-transitory computer-readable medium storing instructions that, when executed by a computer system comprising one or more computing devices, cause the computer system to perform operations for open vocabulary content moderation, the operations comprising:

obtaining one or more natural language prompts that correspond to a content moderation policy;

processing the one or more natural language prompts with a machine-learned model to generate one or more policy embeddings for the content moderation policy;

obtaining an item of content comprising one or more images;

processing the item of content with the machine-learned model to generate one or more content embeddings for the item of content, wherein a single machine-learned multi-modal embedding generation model is used as the machine-learned model to generate both the one or more policy embeddings for the content moderation policy and the one or more content embeddings for the item of content; and comparing the one or more policy embeddings with the one or more content embeddings to determine a policy outcome for the item of content.

\* \* \* \* \*